United States Patent
Aggarwal et al.

(10) Patent No.: US 12,255,944 B2
(45) Date of Patent: Mar. 18, 2025

(54) AUDIO SYNCHRONIZATION IN WIRELESS SYSTEMS

(71) Applicant: BOSE CORPORATION, Framingham, MA (US)

(72) Inventors: Pankaj Aggarwal, Ashland, MA (US); Michael Elliot, North Grafton, MA (US); Mark Corey Hatch, Brighton, MA (US); Dmitrij Golubovskij, Worcester, MA (US)

(73) Assignee: Bose Corporation, Framingham, MA (US)

(*) Notice: Subject to any disclaimer, the term of this patent is extended or adjusted under 35 U.S.C. 154(b) by 197 days.

(21) Appl. No.: 18/121,393

(22) Filed: Mar. 14, 2023

(65) Prior Publication Data

US 2023/0216910 A1 Jul. 6, 2023

Related U.S. Application Data (63) Continuation of application No. 17/367,852, filed on Jul. 6, 2021, now Pat. No. 11,606,408, which is a continuation of application No. 16/544,630, filed on Aug. 19, 2019, now Pat. No. 11,057,451.

(51) Int. Cl.
*H04L 65/80* (2022.01)
*H04L 7/00* (2006.01)
*H04L 43/0852* (2022.01)
*H04L 65/60* (2022.01)

(52) U.S. Cl.
CPC .......... *H04L 65/80* (2013.01); *H04L 7/0041* (2013.01); *H04L 7/0091* (2013.01); *H04L 43/0858* (2013.01); *H04L 65/60* (2013.01)

(58) Field of Classification Search
CPC ........ G06F 1/04; G06F 9/4411; G10L 19/173; H04B 10/114; H04L 7/0041; H04L 7/0091; H04L 43/0811; H04L 43/0858; H04L 65/60–70; H04L 65/80; H04N 21/43076; H04N 21/43637; H04N 21/4398; H04N 21/44227; H04R 3/12; H04R 3/14; H04R 2420/07
See application file for complete search history.

(56) References Cited

U.S. PATENT DOCUMENTS

| | | | |
|---|---|---|---|
| 8,111,843 B2* | 2/2012 | Logalbo | H04R 3/04 381/56 |
| 8,462,627 B2* | 6/2013 | Celinski | H04W 28/10 370/235 |
| 9,554,168 B2* | 1/2017 | Kuwelkar | H04L 12/54 |
| 10,778,361 B1* | 9/2020 | Almog | H04J 3/0682 |

(Continued)

*Primary Examiner* — Thomas R Cairns
(74) *Attorney, Agent, or Firm* — Patterson + Sheridan, LLP (57) ABSTRACT

Methods, devices, and systems are provided for synchronizing a source device with a sink device. In some examples, the source device plays first audio using, e.g., an electro-acoustic transducer. The source device transmits a stream of packets to the sink device to be used by the sink device for playing second audio, where the playing of the second audio is to be synchronized within a predefined tolerance with the playing of the first audio. In response to determining there is a delay in average packet arrival times of the stream of packets at the sink device, the source device adjusts the playing of the first audio to maintain synchronization with the playing of the second audio within the predefined tolerance.

20 Claims, 5 Drawing Sheets

(56) References Cited

U.S. PATENT DOCUMENTS

| | | | |
|---|---|---|---|
| 2009/0091655 A1* | 4/2009 | Russell | H04N 21/43072 |
| | | | 348/E5.009 |
| 2011/0047285 A1* | 2/2011 | Kampmann | H04W 8/04 |
| | | | 709/231 |
| 2018/0167149 A1* | 6/2018 | Stilwell | H04R 5/02 |
| 2019/0158909 A1* | 5/2019 | Kulkarni | H04N 21/4302 |
| 2019/0206421 A1* | 7/2019 | Elliot | G10L 19/26 |
| 2019/0391783 A1* | 12/2019 | Moore | H04R 1/403 |
| 2019/0394603 A1* | 12/2019 | Moore | H04R 29/002 |
| 2020/0059504 A1* | 2/2020 | Ho | H04L 65/80 |
| 2020/0274817 A1* | 8/2020 | Kemmochi | H04L 49/90 |
| 2020/0312374 A1* | 10/2020 | Olofsson | G11B 27/11 |
| 2022/0030505 A1* | 1/2022 | Lee | H04W 48/10 |
| 2022/0272644 A1* | 8/2022 | Lee | H04S 3/00 |

* cited by examiner

AUDIO SYNCHRONIZATION IN WIRELESS SYSTEMS

PRIORITY CLAIM

This application claims priority to pending U.S. patent application Ser. No. 17/367,852, filed on Jul. 6, 2021, which claims priority to U.S. patent application Ser. No. 16/544,630, filed on Aug. 19, 2019, now U.S. Pat. No. 11,057,451, the entire contents of which are incorporated herein by reference.

FIELD

Aspects of the disclosure generally relate to wireless audio systems, and more specifically to techniques for synchronizing audio between wireless audio devices.

BACKGROUND

Audio devices designed for distribution and reproduction of audio are available in several hardware configurations and can use a range of technologies for processing and rendering audio streams and for communicating with other devices including audio input devices and audio output devices. For example, speakers range from Bluetooth® speakers, (Wi-Fi)' speakers, Audio for Video speakers (e.g., sound bars) and speakers that use other communication protocols or a combination of communication protocols. The wide array of device architectures, configurable device network topologies and communication technologies (e.g., Bluetooth, Wi-Fi etc.) used by the various audio devices to communicate with other devices makes interoperation and synchronization between these devices complicated and difficult to coordinate and execute.

SUMMARY

All examples and features mentioned herein can be combined in any technically possible manner.

Aspects of the present disclosure provide a method for synchronizing a source with a sink device. The method generally includes transmitting a stream of packets to the sink device, receiving feedback from the sink device indicating packet arrival times of the packets at the sink device, determining, based at least on the feedback, an average time shift in the packet arrival times at the sink device, wherein the average time shift is relative to expected packet arrival times of the packets at the sink device, detecting that the average time shift exceeds a threshold, and in response to the detecting, adjusting a streaming time of the stream of packets to synchronize, within a predefined tolerance, the source device with the sink device.

In an aspect, the feedback comprises an acknowledgement message for each packet in the stream of packets transmitted by the source device.

In an aspect, the method further includes determining a time shift in an arrival time of at least one acknowledgement message relative to an expected arrival time of the at least one acknowledgement message, determining an average time shift in arrival times of acknowledgement messages over a predetermined time period, and designating the average time shift in the arrival times of the acknowledgement messages as the average time shift in packet arrival times at the sink device.

In an aspect, the feedback comprises a delay report indicating the average time shift in the packet arrival times at the sink device.

In an aspect, the average time shift in the packet arrival times is a positive time shift.

In an aspect, wherein adjusting the streaming time of the stream of packets includes pausing the streaming of the packets for a time equal to a value of average time shift, and resuming the streaming of the packets after the pausing.

In an aspect, adjusting the streaming time of the stream of packets comprises temporarily streaming the packets at a slower than a current stream rate at least till the average time shift falls below the threshold.

In an aspect, the average time shift in the packet arrival times is a negative time shift, wherein adjusting the streaming time of the stream of packets comprises speeding up the streaming time by the determined average time shift.

In an aspect, the method further includes transmitting a play-at-time to the sink device for playing a first sample after adjusting the streaming time of the stream of packets.

Aspects of the present disclosure provide an apparatus for synchronizing a source device with a sink device. The apparatus generally includes at least one processor generally configured to transmit a stream of packets to the sink device, receive feedback from the sink device indicating packet arrival times of the packets at the sink device, determine, based at least on the feedback, an average time shift in the packet arrival times at the sink device, wherein the average time shift is relative to expected packet arrival times of the packets at the sink device, detect that the average time shift exceeds a threshold, and in response to the detecting, adjust a streaming time of the stream of packets to synchronize, within a predefined tolerance, the source device with the sink device.

In an aspect, the feedback comprises an acknowledgement message for each packet in the stream of packets transmitted by the source device.

In an aspect, the at least one processor is further configured to determine a time shift in an arrival time of at least one acknowledgement message relative to an expected arrival time of the at least one acknowledgement message, determine an average time shift in arrival times of acknowledgement messages over a predetermined time period, and designate the average time shift in the arrival times of the acknowledgement messages as the average time shift in packet arrival times at the sink device.

In an aspect, the average time shift in the packet arrival times is a positive time shift.

In an aspect, the at least one processor adjusts the streaming time of the stream of packets by pausing the streaming of the packets for a time equal to a value of average time shift, and resuming the streaming of the packets after the pausing.

In an aspect, the at least one processor adjusts the streaming time of the stream of packets by temporarily streaming the packets at a slower than a current stream rate at least till the average time shift falls below the threshold.

Aspects of the present disclosure provide a computer-readable medium for synchronizing a source device with a sink device, the computer-readable medium storing instructions which when processed by at least one processor perform a method. The method generally includes transmitting a stream of packets to the sink device, receiving feedback from the sink device indicating packet arrival times of the packets at the sink device, determining, based at least on the feedback, an average time shift in the packet arrival times at the sink device, wherein the average time shift is relative to expected packet arrival times of the packets at the sink device, detecting that the average time shift exceeds a threshold, and in response to the detecting, adjusting a streaming time of the stream of packets to synchronize, within a predefined tolerance, the source device with the sink device.

In an aspect, the feedback comprises an acknowledgement message for each packet in the stream of packets transmitted by the source device.

In an aspect, the computer-readable medium further includes instructions for determining a time shift in an arrival time of at least one acknowledgement message relative to an expected arrival time of the at least one acknowledgement message, determining an average time shift in arrival times of acknowledgement messages over a predetermined time period, and designating the average time shift in the arrival times of the acknowledgement messages as the average time shift in packet arrival times at the sink device.

In an aspect, the average time shift in the packet arrival times is a positive time shift.

In an aspect, adjusting the streaming time of the stream of packets includes pausing the streaming of the packets for a time equal to a value of average time shift, and resuming the streaming of the packets after the pausing.

DETAILED DESCRIPTION

A device capable of communicating with other devices using the wireless Bluetooth protocol can generally operate in a Bluetooth source mode and a Bluetooth sink mode. When operating in a Bluetooth source mode, the device is configured to transmit data (e.g., Advanced Audio Distribution Profile, A2DP audio stream) as a Bluetooth source. When operating in a Bluetooth sink mode, the device is configured to receive data (e.g., A2DP audio stream) as a Bluetooth sink. It may be noted that a particular device may be configured to transmit as a Bluetooth source and receive as a Bluetooth sink, one at a time or sometimes simultaneously.

When a device is transmitting a data stream (e.g., A2DP audio stream) as a Bluetooth source to another device receiving the data stream as a Bluetooth sink, a number of factors may cause one or more packets of the data stream to arrive at the Bluetooth sink later than expected. These factors can include the sink device temporarily tuning away from the Bluetooth link, retransmissions of one or more packets, or any other factor that can interrupt the normal flow of packets between the source and sink devices. This delay in arrival of packets at the Bluetooth sink can cause the Bluetooth sink to go out of sync with the Bluetooth source.

One technique for maintaining synchronization between the Bluetooth source and the Bluetooth sink can include including a play-at-time in each packet transmitted by the Bluetooth source, wherein the play-at-time of a particular packet indicates the time instant the packet is to be played by the Bluetooth sink. This way the Bluetooth sink, based on the play-at-time information included in the packets, can adjust its timing from time to time to stay in sync with the Bluetooth source. However, this technique may not always work as certain Bluetooth sink devices can be non-cooperative and may not honor the play-at-time included in the packets.

Certain aspects of the present disclosure discuss improved techniques for maintaining synchronization between Bluetooth source and Bluetooth sink devices. The discussed techniques include the Bluetooth source device detecting a delay in packet arrival times at the Bluetooth sink device based on acknowledgement of transmitted packets from the Bluetooth sink device, and then adjusting the timing of transmission of the data stream to bring the source device in back in sync with the sink device. The discussed aspects are particularly useful in the context of non-cooperative Bluetooth sink devices as the discussed techniques do not require any additional action on the part of the sink device (other than regular operations already performed by the sink device) to bring the sink device back in sync with the source device. For example, a Bluetooth sink device is generally configured to send feedback to the transmitting Bluetooth Source device acknowledgement feedback messages corresponding to each received packet or a payload of multiple packets. As discussed in aspects of the present disclosure, the Bluetooth source device can measure a potential delay in packet arrival times at the Bluetooth sink device, based on these acknowledgement messages, without any additional feedback or action from the Bluetooth sink device. Thus, the techniques discussed in certain aspects of the present disclosure can be implemented without any additional communication and/or processing overhead on part of the Bluetooth sink device. However, it may be noted that, the discussed aspects can apply to all types of Bluetooth devices and not just non-cooperative Bluetooth sink devices.

Figure 1:
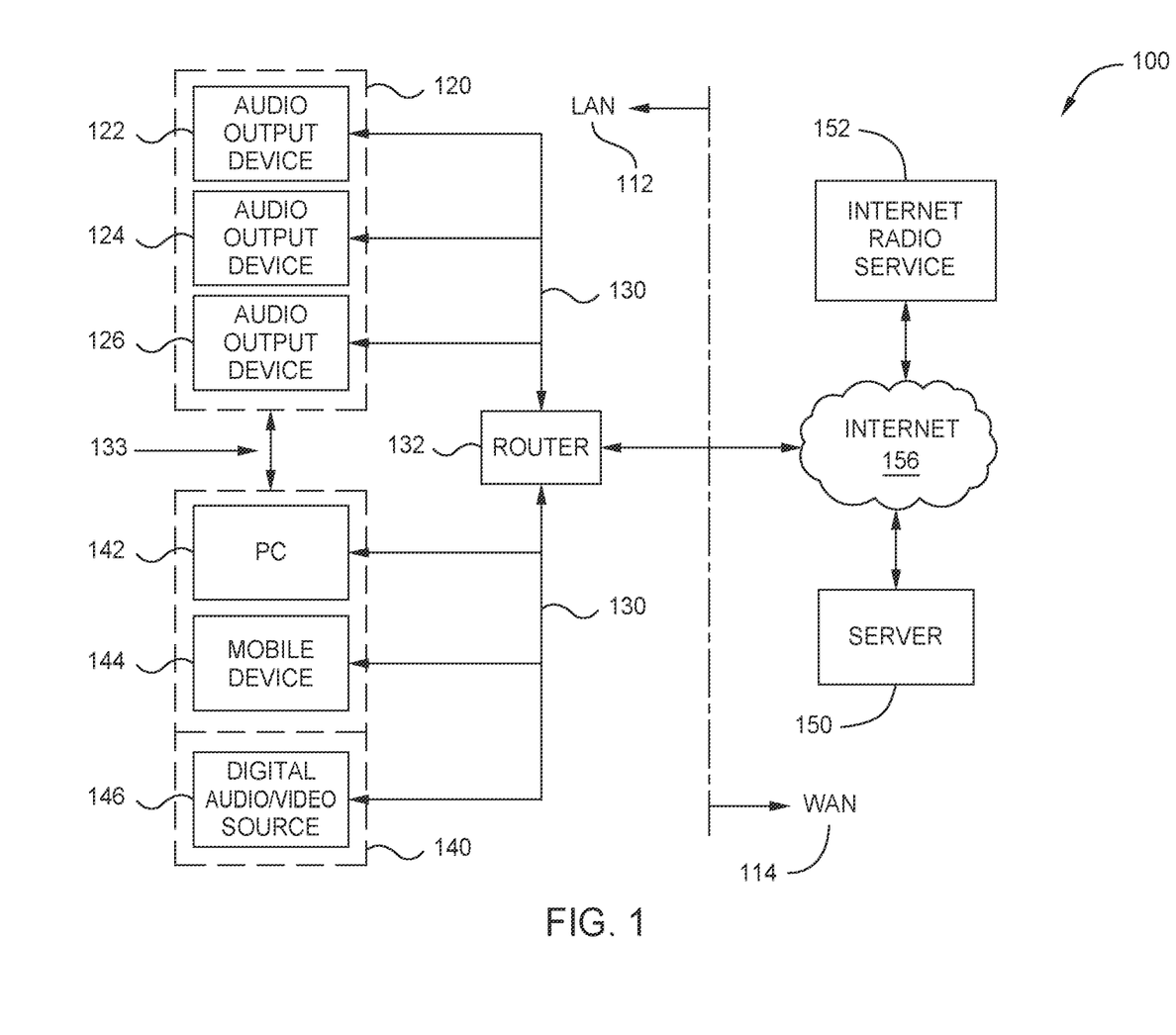
FIG. 1 illustrates an example audio distribution system in which aspects of the present disclosure can be practiced.

FIG. 1 illustrates an example audio distribution system 100 in which aspects of the present disclosure can be practiced.

Audio distribution system 100 includes non-limiting examples of wireless speaker packages and other wireless audio sources and sinks in which aspects of the present disclosure can be implemented. In an aspect, system 100 is adapted to deliver digital audio (e.g., digital music). As shown, system 100 includes a number of audio output devices 122, 124 and 126 which are among a group of audio output devices 120 of the system 100. In an aspect, each of the audio output devices is a wireless speaker package that is able to receive digital audio signals and convert them to analog form. The speaker packages also include an electroacoustic transducer that receives the analog audio signals and transduces them into sound. The wireless speaker packages also include at least one processor for processing audio data. The group of audio output devices 120 can include speaker packages with different hardware architectures and audio configurations. Further, the speaker packages can support different software/firmware protocols and protocol versions thereof for transport and control of audio flows, and further can support different media file formats (e.g., mp3, mp4 etc.). Further, different speaker packages can support different wired and/or wireless communication technologies (e.g., Bluetooth, Wi-Fi, Apple Airplay®, Apple Airplay® 2 a proprietary protocol stack/suite developed by Apple Inc., with headquarters in Cupertino, Calif., that allows wireless streaming of audio, video, and photos, together with related metadata between devices, etc.) to wirelessly communicate with other speaker packages in the group as well as other devices in the system 100. In an aspect, one or more of the speaker packages can support multiple wired and/or wireless communication technologies and can be configured (e.g., by a user) to communicate with other devices in the system 100 using one or more of the supported communication technologies at one time. For instance, one or more of the speaker packages can support communication with other devices in the system 100 using Wi-Fi and at least one Bluetooth protocol. In an aspect, one or more of the speaker packages that supports both Wi-Fi and Bluetooth communication modes can support simultaneous Wi-Fi and Bluetooth communications at one time in an allotted band of frequencies, often referred to as Wi-Fi/Bluetooth coexistence. For example, a speaker package can receive an audio stream from a smart phone using Bluetooth and can further simultaneously redistribute the audio stream to one or more other speakers over Wi-Fi. In an aspect, one or more of the speaker packages are designed with audio source capabilities in addition to audio sink capabilities. For example, one or more of the speaker packages can be configured as a master speaker of a network of speakers in the system 100, and can receive an audio stream as an audio sink and then further redistribute the audio stream as an audio source to one or more other speakers in the system 100.

System 100 further includes one or more computing devices 140 and/or one or more separate local digital audio/video source devices 146. In this example the computing devices include a personal computer 142 and a mobile computing device 144 such as a smartphone, tablet or the like. In an aspect, the computing devices 140 and the digital audio video devices 146, like the audio output devices, can support different wired and wireless communication technologies (e.g., Bluetooth, Wi-Fi, Apple Airplay®, Apple Airplay® 2 etc.) for communicating with other devices in the system 100 including the audio output devices 120. In an aspect, each of the computing devices 140 and the digital audio/video source devices 146 can support multiple wired and/or wireless communication technologies.

In an aspect, each device in the system 100 that is capable of Wi-Fi communication can be connected to a network 130 via a router/access point 132 and can communicate with other Wi-Fi enabled devices in the system 100 over the network 130 via the router/access point 132. In this example, as shown, the audio output devices from group 120, the computing devices 140 and the digital audio/video source devices 146 are connected to the network 130 via the router/access point 132. In this example, the network 130 is part of a wireless Local Area Network (WLAN) 112 which is connected to a wide area network (WAN) 114 by connection to Internet 156. WAN 114 includes a server 150 and an Internet radio service 152 which can both communicate with LAN 112 via the Internet 156.

In certain aspects, one or more of the computing devices 140 and the digital audio/video source device 146 can be connected to one or more of audio output devices 120 via a personal area network (PAN) 133 (e.g., a wireless PAN). PAN 133 can comprise a direct point-to-point wireless connection (e.g., using Bluetooth, Apple Airplay®, Apple Airplay® 2 or other point to point protocol) between the devices 140/146 and one or more of the audio output devices 122, 124 or 126. In an aspect, one or more of the audio output devices 120 can be capable of communicating with other audio output devices within the group via other wireless communication methods (e.g., other than Wi-Fi) including a point-point communication method such as Bluetooth.

In an aspect, the sources of digital audio including the computing devices 140 and the digital audio/video source device 146 provide access to content such as audio streams that are communicated over network 130 and/or network 133 to the audio output devices. The sources of such audio streams can include, for example, Internet radio stations sourced by an internet radio service such as internet radio service 152 and user defined playlists. Each of such digital audio sources maintains a repository of audio content which can be chosen by the user to be played over one or more of the audio output devices. Such digital audio sources can include Internet-based music services such as Pandora®, Spotify® and TuneIn®, for example. The digital audio/video source device 146 can include a network attached storage device. Media server applications running on the PC 142 and the mobile computing device 144 can be used to access digital content over the internet and source audio data for outputting by one or more audio output devices. Typically, the user selects the audio source and the audio output devices via PC 142 and/or mobile device 144. Note that the present disclosure primarily describes the techniques herein in the context of transferring audio data, for ease of description. However, in at least some implementations, the techniques described herein equally apply to the distribution of any media data, which can include video, audio, and/or image data. For instance, digital media sources can be Internet-based content services such as Netflix®, Hulu® and Amazon's Prime Video, for example.

In certain aspects, one or more of the computing devices 140 including the PC 142 and/or the mobile device 144 can be used as a control entity for managing creation and control of speaker groups for synchronized audio output. For example, a software application accessible via the PC 142 or the mobile device 144 can be operated by a user to create new speaker groups or manage existing speaker groups for playback of synchronized audio by the speakers in a created group of speakers.

Figure 2:
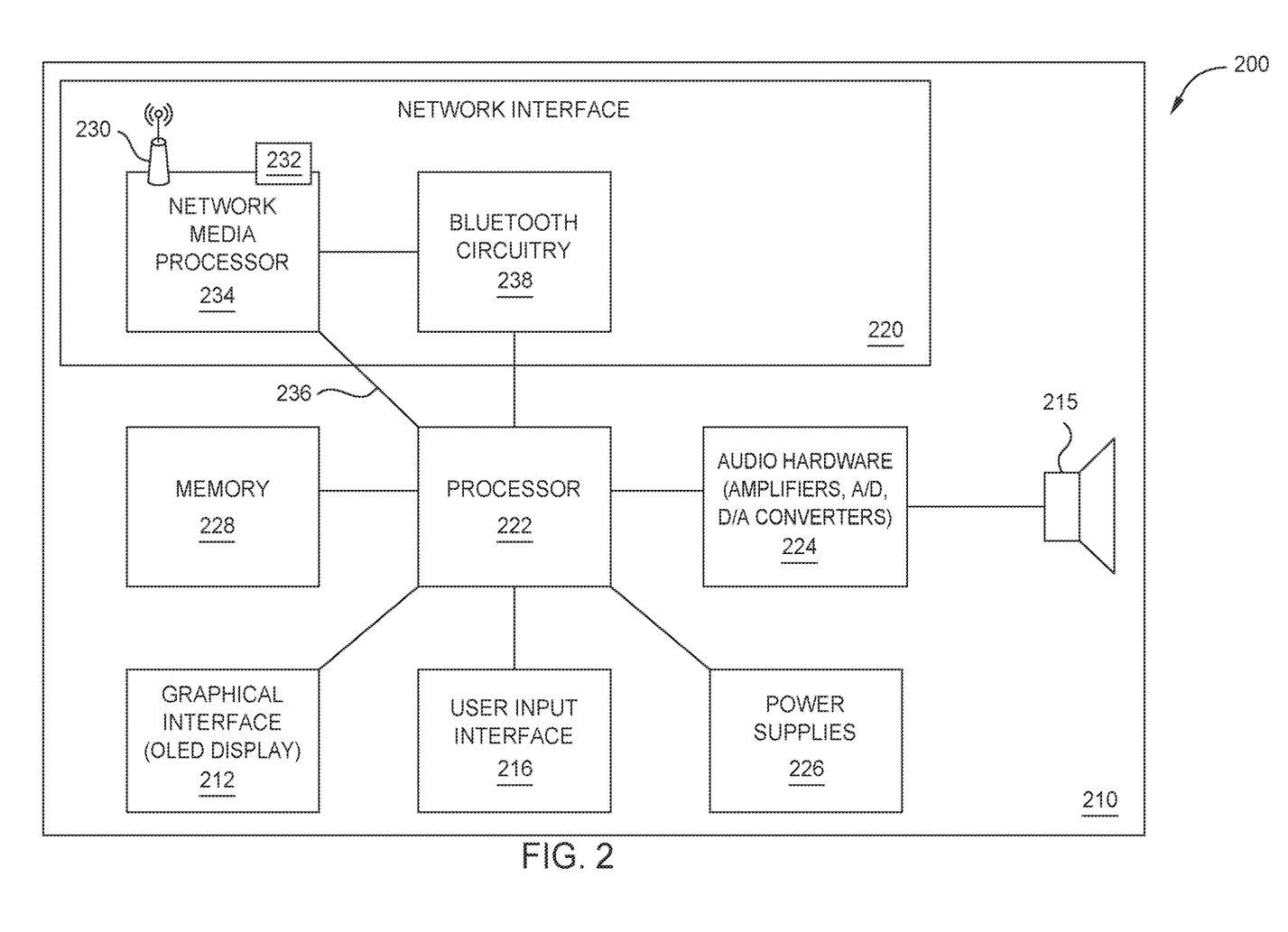
FIG. 2 illustrates an exemplary wireless speaker package, in accordance with certain aspects of the present disclosure.

FIG. 2 illustrates an exemplary wireless speaker package 200, in accordance with certain aspects of the present disclosure. As shown, the wireless speaker package 200 includes an enclosure 210. In the enclosure 210 resides an optional graphical interface 212 (e.g., an OLED display) which can provide the user with information regarding currently playing ("Now Playing") music. The speaker package 200 includes one or more electro-acoustic transducers 215 for outputting audio. Wireless speaker package device 200 also includes a user input interface 216. The user input interface 216 can include a plurality of preset indicators, which can be hardware buttons. The preset indicators can provide the user with easy, one press access to entities assigned to those buttons. The assigned entities can be associated with different ones of the digital audio sources such that a single wireless speaker package 200 can provide for single press access to various different digital audio sources.

Note that the present disclosure primarily describes the techniques described herein in the context of use with wireless speaker packages, for ease of description. However, in at least some implementations, the techniques described herein equally apply to wearable audio devices, such as an audio device that fits around, on, in, or near an ear (including open-ear audio devices worn on the head or shoulders of a user) and that radiates acoustic energy into or towards the ear. Wearable audio devices are sometimes referred to as headphones, earphones, earpieces, headsets, earbuds, or sport headphones. However, a wearable audio device could be in other form factors, such as a headband, neckband, or glasses. A wearable audio device includes an acoustic driver to transduce audio signals to acoustic energy. The acoustic driver is housed in an earcup, in some implementations. In such implementations, each earcup may be connected mechanically to another earcup or headphone, for example by a headband and/or by leads that conduct audio signals to an acoustic driver in the ear cup or headphone. A wearable audio device may include components for wirelessly receiving audio signals. A wearable audio device may include components of an active noise reduction (ANR) system. Wearable audio devices may also include other functionality such as a microphone so that they can function as a headset.

In addition, in at least some implementations, the techniques described herein equally apply to video devices, such as smartphones, tablet computers, laptop computers, desktop computers, smart televisions, and other computing devices or systems including a display. In such implementations that include devices having at least one display, the techniques can be used for synchronizing media data that includes at least video data, and optionally, audio data and/or image data. Therefore, the techniques described herein can assist with issues related to audio-to-video synchronization (which is also known as lip synchronization or lip sync error), as well as other challenges related to synchronizing video (and optionally, audio) playback.

Wireless speaker package 200 also includes a network interface 220, at least one processor 222, audio hardware 224, power supplies 226 for powering the various components of the speaker package 200, and memory 228. In an aspect, the processor 222, the graphical interface 212, the network interface 220, the audio hardware 224, the power supplies 226, and the memory 228 are interconnected using various buses, and several of the components can be mounted on a common motherboard or in other manners as appropriate.

The network interface 220 provides for communication between the wireless speaker package 200 and one or more audio sources and other wireless speaker packages including one or more networked wireless speaker packages and other audio playback devices via one or more communications protocols. The network interface 220 can provide either or both of a wireless interface 230 and a wired interface 232. The wireless interface 230 which can include a wireless transceiver allows the wireless speaker package 200 to communicate wirelessly with other devices in accordance with one or more wireless communication protocol such as IEEE 802.11, Bluetooth, Apple AirPlay® and/or Apple Airplay® 2. The wired interface 232 provides network interface functions via a wired (e.g., Ethernet) connection.

In certain aspects, the network interface 220 can also include a network media processor 234 for supporting the different wireless and wired communication protocols. For example, if a user connects an AirPlay® or Apple Airplay® 2 enabled device, such as an iPhone or iPad device, to the network, the user can then stream music to the network connected audio playback devices via Apple AirPlay® or Apple Airplay® 2. Notably, the audio playback device can support audio-streaming via AirPlay®, Apple Airplay® 2 and/or DLNA's UPnP protocols, and all integrated within one device.

All other digital audio received as part of network packets comes straight from the network media processor 234 through a USB bridge 236 to the processor 222 and runs into the decoders, DSP, and eventually is played back (rendered) via the electro-acoustic transducer(s) 215.

The network interface 220 can also include a Bluetooth circuitry 238 for Bluetooth applications (e.g., for wireless communication with a Bluetooth enabled audio source such as a smartphone or tablet) or other Bluetooth enabled speaker packages. In an aspect, all data received on a Bluetooth link using the wireless interface 230 is channeled to the Bluetooth circuitry 238 via the network media processor 234. Similarly, all data that is to be transmitted on the Bluetooth link using the wireless interface 230 is channeled via the network media processor 234.

In an aspect, the network interface 220 supports communication with other devices using multiple communication protocols simultaneously at one time. For instance, the speaker package 210 can support Wi-Fi/Bluetooth coexistence and can support simultaneous communication using both Wi-Fi and Bluetooth protocols at one time. For example, the speaker package 210 can receive an audio stream from a smart phone using Bluetooth and can further simultaneously redistribute the audio stream to one or more other speakers over Wi-Fi. In an aspect, like most commercially available speaker packages, network interface 220 can include only one Radio Frequency (RF) Chain capable of communicating using only one communication method (e.g., Wi-Fi or Bluetooth) at one time. In this context, the network interface 220 may simultaneously support Wi-Fi and Bluetooth communications by time sharing the single RF chain between Wi-Fi and Bluetooth, for example, according to a time division multiplexing (TDM) pattern.

Streamed data passes from the network interface 220 to the processor 222. The processor 222 can execute instructions within the wireless speaker package (e.g., for performing, among other things, digital signal processing, decoding, and equalization functions), including instructions stored in the memory 228. The processor 222 can be implemented as a chipset of chips that includes separate and multiple analog and digital processors. The processor 222 can provide, for example, for coordination of other components of the audio speaker package 200, such as control of user interfaces, applications run by the audio playback device 200 and the like.

In certain aspects, the memory 228 stores software/firmware related to protocols and versions thereof used by the speaker package 200 for communicating with other networked speakers. For example the software/firmware governs how the speaker package 200 communicates with other speakers for synchronized playback of audio. In an aspect, the software/firmware includes lower level frame protocols related to control path management and audio path management. The protocols related to control path management generally include protocols used for exchanging messages between speakers. The protocols related to audio path management generally include protocols used for clock synchronization, audio distribution/frame synchronization, audio decoder/time alignment and playback of an audio stream. In an aspect, the memory can also store various codecs supported by the speaker package for audio playback of respective media formats. In an aspect, the software/firmware stored in the memory can be accessible and executable by the processor 222 for synchronized playback of audio with other networked speaker packages.

The processor 222 provides a processed digital audio signal to the audio hardware 224 which includes one or more digital-to-analog (D/A) converters for converting the digital audio signal to an analog audio signal. The audio hardware 224 also includes one or more amplifiers which provide amplified analog audio signals to the electroacoustic transducer(s) 215 for sound output. In addition, the audio hardware 224 can include circuitry for processing analog input signals to provide digital audio signals for sharing with other devices, for example, other speaker packages for synchronized output of the digital audio.

The memory 228 can include, for example, flash memory and/or non-volatile random access memory (NVRAM). In some implementations, instructions (e.g., software) are stored in an information carrier. The instructions, when executed by one or more processing devices (e.g., the processor 222), perform one or more processes, such as those described elsewhere herein. The instructions can also be stored by one or more storage devices, such as one or more computer or machine-readable mediums (for example, the memory 228, or memory on the processor). The instructions can include instructions for performing decoding (i.e., the software modules include the audio codecs for decoding the digital audio streams), as well as digital signal processing and equalization.

When a Bluetooth source device is transmitting a stream of packets to a Bluetooth sink device, one factor that may cause one or more packets to arrive later than expected at the sink device can include the sink device temporarily tuning away to receive data from a different device. For example, certain devices (e.g., computing devices 140, audio output devices 120 etc. as shown in FIG. 1) support simultaneous Wi-Fi and Bluetooth communications, often referred to as Wi-Fi/Bluetooth coexistence. These devices include audio/video receivers, sound bars, audio speakers and the like. Devices that support Wi-Fi/Bluetooth coexistence generally simultaneously support at least a Wi-Fi communication mode and at least one Bluetooth communication mode at one time. In an aspect, the Bluetooth communication mode may include a Bluetooth Sink mode in which the device is configured to receive an audio stream (e.g., A2DP stream) or a Bluetooth Source mode in which the device is configured to transmit an audio stream (e.g., A2DP stream).

In certain aspects, most commercially available devices include a single Radio Frequency (RF) chain including a single transceiver for receiving and transmitting data, allowing the device to communicate using only one of the supported communication modes (e.g., Wi-Fi or Bluetooth) at one time. A RF chain generally incudes a transceiver and other circuitry for transmitting and/or receiving data. A device having a single RF chain generally supports simultaneous communication using multiple communication modes by time sharing its RF chain between each of the communication modes. For example, a device may simultaneously communicate using Wi-Fi and Bluetooth links by timesharing its RF chain between the Wi-Fi and the Bluetooth communication. This means that each of the Wi-Fi and Bluetooth communication modes are allotted particular time intervals according to a time division multiplexing pattern and communication in a particular time interval is carried out using the communication mode allotted for the time interval.

As a result, when a Bluetooth source device, while transmitting an A2DP stream to a Bluetooth sink device on a Bluetooth link, needs to receive data on the Wi-Fi link, the source device must tune away its transceiver from the Bluetooth link and tune in to the Wi-Fi link in order to receive Wi-Fi data. In one example use case, a master speaker capable of Wi-Fi/Bluetooth coexistence can be streaming audio data over the Wi-Fi link from an audio source (e.g., a Wi-Fi router) for playing by the master speaker and can simultaneously be streaming the audio data stream to a slave speaker using a Bluetooth link for playing by the slave speaker in sync with the master speaker. In this case, the master speaker periodically needs to tune away from the Bluetooth link in order to receive the Wi-Fi data stream from the audio source. Every time the source device tunes away from the Bluetooth link, the packets scheduled to be transmitted during the tune away window cannot be transmitted to the sink device at their scheduled times. The source device is able to transmit these packets after the source device tunes back to the Bluetooth link. As a result, one or more packets originally scheduled to be transmitted during the tune away window arrive at the sink device later than expected. This delay in arrival of packets can in turn cause the slave speaker to render the packets and output audio associated with the packets later than expected, resulting in a phase difference between the audio outputs of the master and slave speakers. Once the phase difference exceeds a certain level (e.g., 10 milliseconds (ms)), human ears can perceive this phase difference resulting in a less than optimal user experience.

Figure 3:
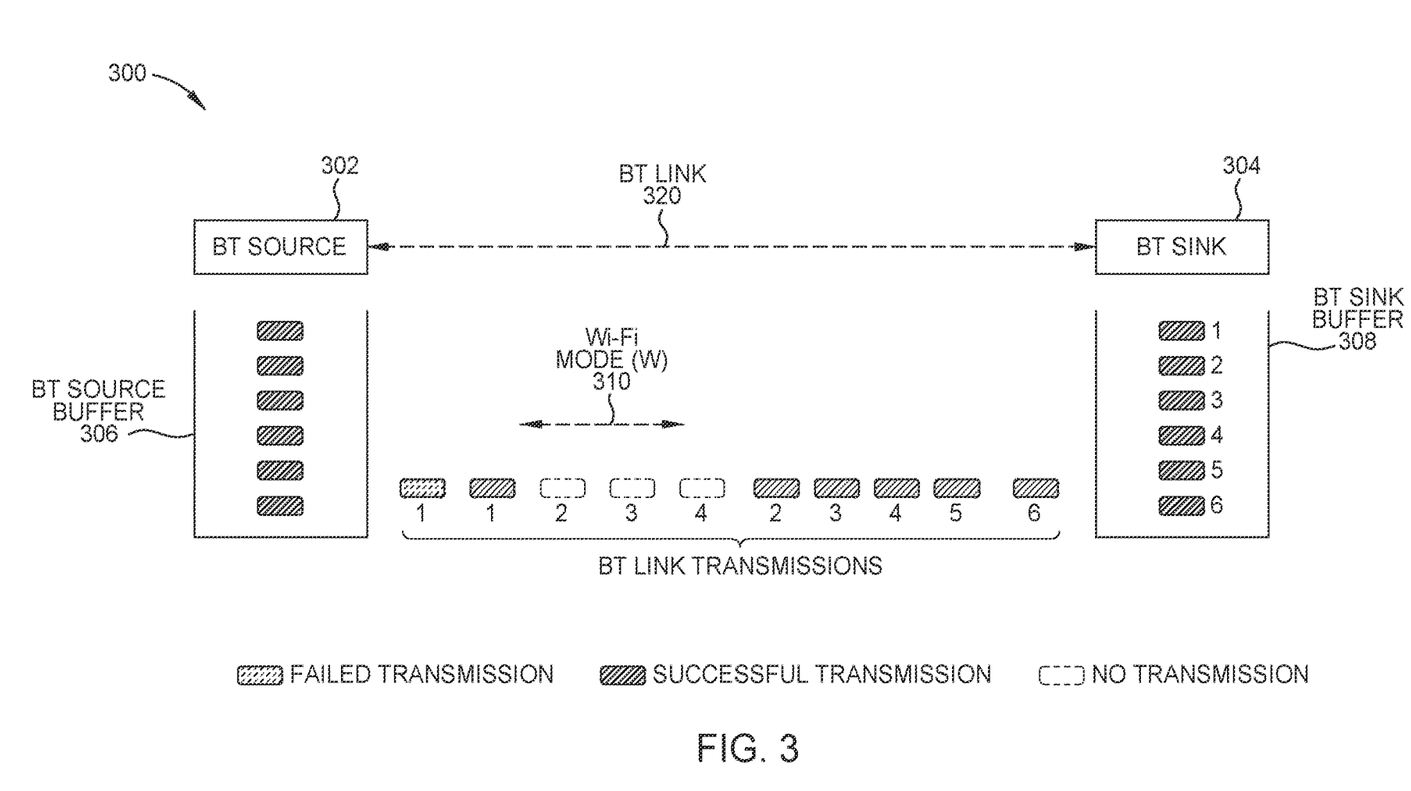
FIG. 3 illustrates an example of packet arrival delay at a Bluetooth sink device during transmission of a packet stream (e.g., an audio stream) from a Bluetooth source device to the Bluetooth sink device, in accordance with certain aspects of the present disclosure.

FIG. 3 illustrates an example 300 of packet arrival delay at a Bluetooth sink device during transmission of a packet stream (e.g., an audio stream) from a Bluetooth source device to the Bluetooth sink device, in accordance with certain aspects of the present disclosure.

As shown in FIG. 3, a stream of packets including packets 1-6 are transmitted from the Bluetooth source device (shown as BT source 302) to a Bluetooth sink device (shown as BT sink 304) over a Bluetooth link (shown as BT link 320). Example 300 assumes that the BT source 302 supports Wi-Fi/Bluetooth coexistence, and that simultaneous Wi-Fi and Bluetooth communication is supported by the BT source 302 by time sharing a single transceiver of the BT source 302 using time division multiplexing (TDM) of the Wi-Fi and Bluetooth data streams. In the example 300 the BT source 302 can be a master speaker receiving a Wi-Fi audio stream from an audio source (e.g., via a Wi-Fi router) which the master speaker locally renders and outputs using an acoustic transducer of the master speaker. The BT source 302/master speaker simultaneously streams the audio stream to the BT sink 304 (which can be a slave speaker controlled by the master) over the BT link 320 for outputting by the BT in sync with the master speaker audio output.

BT source 302 includes a BT source buffer 306 which buffers data packets received over the Wi-Fi link before transmitting each data packet at pre-determined inter-packet intervals. The BT sink 304 includes a BT sink buffer 308 which buffers received data packets before rendering and outputting by an acoustic transducer at the BT sink 304. As shown in FIG. 3, packet 1 is not transmitted successfully on BT link 320 in a first attempt and has to be retransmitted. Thus, packet #1 is delayed and arrives late at BT sink 304. The BT source 302 tunes away to the Wi-Fi link after retransmitting packet 1. As shown, packets 2, 3 and 4 are scheduled to be transmitted during the Wi-Fi mode window 310, but cannot be transmitted as the transceiver is tuned away from the BT link 320. Once the Wi-Fi mode window 310 ends, the BT source 302 tunes back the transceiver to the BT link 320 and starts transmitting the packets on the BT link 320. The BT source 302 resumes packet transmission at an accelerated pace (e.g., with shorter inter packet intervals) in an attempt to catch up with the timing. However, it can take a while (e.g., few milliseconds to a few seconds) for the BT transmission to catch up with the correct timing, and in the meantime packets arrive at the BT sink delayed. For example, if the BT source 302 normally (without any interruptions) would transmit packets at 10 ms intervals, and the expected transmission time from the source to the sink is 40 ms, packets 1, 2, 3, 4 should ideally arrive at the BT sink 304 at 40 ms, 50 ms, 60 ms and 70 ms. However, if the device tunes away during the normal transmission times of packets 2, 3 and 4, these packets are transmitted in a burst after tune back to the BT link 320. Assuming that packets 2, 3, and 4 (after tune back) actually arrive at the sink at times 65 ms, 70 ms and 75 ms, packet 2 arrives at the sink with a 15 ms delay, packet 3 arrives with a 10 ms delay and packet 4 arrives with a 5 ms delay. Thus, by the time the sink receives packet 4, the average delay of packet arrival at the sink is (15+10+5)/3=10 ms. Thus, the play time of the audio stream at the BT sink 304 has shifted by an average delay of 10 ms by the time packet 4 is received. Thus, the audio being output by the transducer at the BT sink 304 speaker is off by an average of 10 ms from the audio being output by a transducer at the BT source 302 (e.g., source master speaker).

In the example 300 packets 2-6 arrive delayed at the BT sink 304. This results in delayed rendering and outputting of the packets by the BT sink causing the audio output of BT sink 304 to be out of phase with the audio output by the BT source 302. Generally, the BT source 302 knows the latencies associated with the BT link 320 (e.g., transmission time from source to sink) and the BT sink 304 (e.g., internal device latencies including rendering latency) and configures timing of output of an audio track locally by the BT source 302 by accounting for these known latencies, for synchronized output of audio with the BT sink 304. However, the interruptions in the transmission of packets on the BT link 320 add unexpected additional delays causing the BT sink to output the audio with an unexpected phase difference.

As noted above, once the phase difference between the source and the sink exceeds beyond a certain threshold level (e.g., 10 ms), human ears can perceive this phase difference resulting in less than optimal user experience. Thus, in order to maintain optimal user experience, the phase difference between the BT source and the BT sink cannot be allowed to exceed a certain threshold level (e.g., 10 ms).

It may be noted that while in the example 300, Wi-Fi tune away is the major factor governing the delay of the packet stream arriving at the BT sink 304, packet arrival delay at the BT sink 304 can be as a result of any other single factor or a combination of multiple factors that interrupt the normal scheduled flow of the packets. In the example 300, while retransmission delay associated with packet #1 is less significant as compared to packet delay as a result of Wi-Fi tune away, if the BT link 320 is not very robust (e.g., the BT sink 304 is physically placed far away from BT source 302) more packets may need to be retransmitted and the retransmission delay may be a considerable portion of the total delay. In fact, if too many packets need retransmission, the retransmission delay alone as a result of the retransmissions can be large enough to cause a perceivable phase difference between the audio outputs at the BT source 302 and the BT sink 304.

In an aspect, another factor that can result in the delayed arrival of a packet stream at the BT sink 304 can be the BT sink 304 tuning away from the BT source in order to monitor another communication link (e.g., a Wi-Fi link or another BT link). In other aspects, a similar delay in packet arrival times can occur if the BT sink 304 temporarily powers down or enters a temporary inactive/sleep state.

Thus, regardless of the nature of interruption(s), a large enough delay in the arrival of packets at the BT sink 304 can cause a perceivable phase difference between the audio outputs at the BT source 302 and the BT sink 304.

As noted above, aspects of the present disclosure discuss improved techniques for maintaining synchronization between Bluetooth source and Bluetooth sink devices. The discussed techniques include detecting and measuring by the BT source device an amount of delay in packet arrival times at the BT sink device, and in response, taking at least one action to bring the BT source back in synchronization with the BT sink. The discussed aspects are particularly useful in the context of non-cooperative Bluetooth sink devices as the discussed techniques do not require any additional action on the part of the sink device (other than regular operations already performed by the sink device) to bring it back in sync with the source device. However, it may be noted that, the discussed aspects can apply to all types of Bluetooth devices and not just non-cooperative Bluetooth sink devices.

Figure 4:
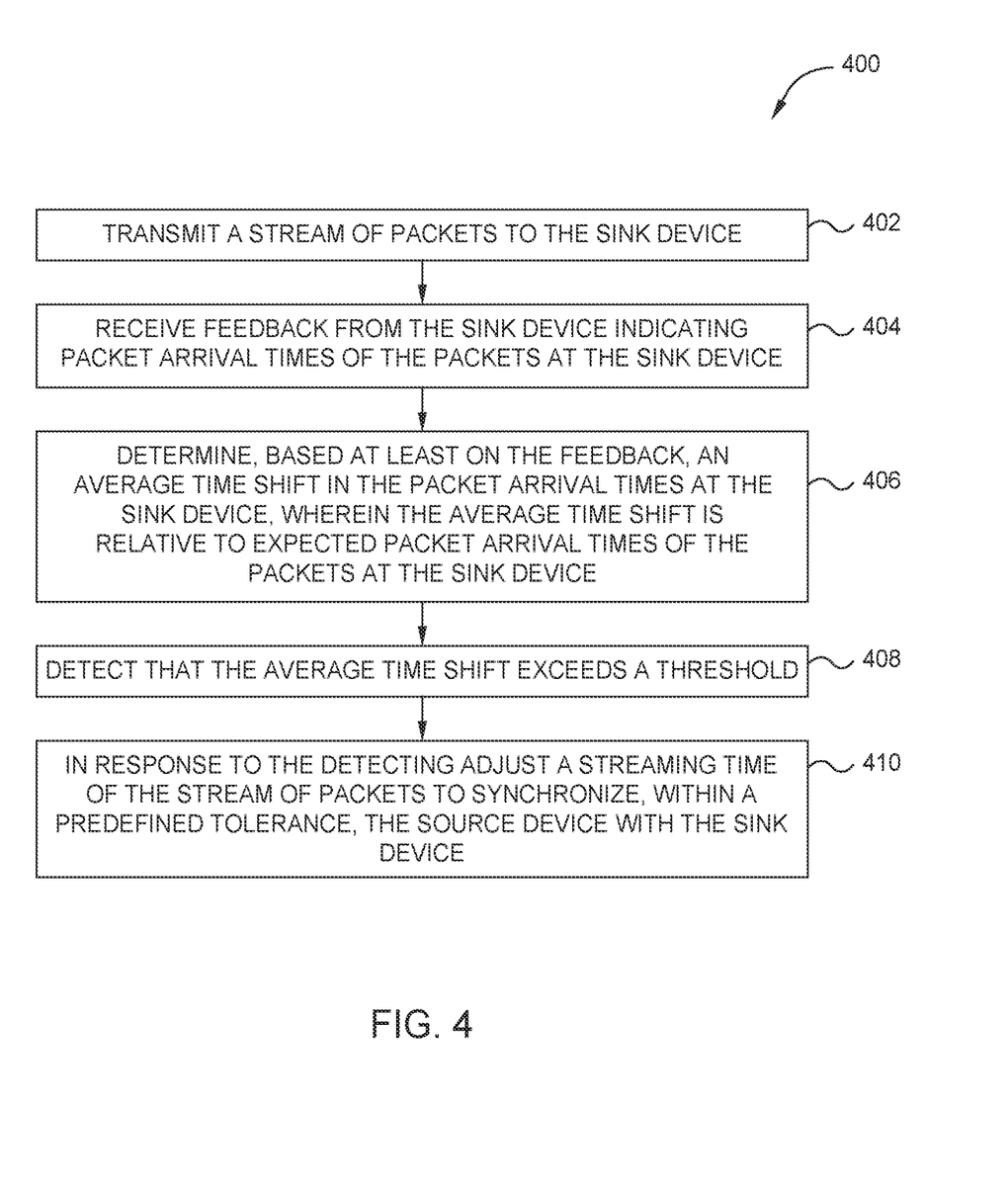
FIG. 4 illustrates example operations that can be performed by a source device for maintaining synchronization with a sink device, in accordance with certain aspects of the present disclosure.

FIG. 4 illustrates example operations 400 that can be performed by a source device (e.g., BT source 302) for maintaining synchronization with a sink device (e.g., BT sink 304), in accordance with certain aspects of the present disclosure.

Operations 400 begin, at 402, by transmitting a stream of packets to the sink device.

At 404, the source device receives feedback from the sink device indicating packet arrival times of the packets at the sink device.

At 406, based at least on the feedback, the source device determines an average time shift in the packet arrival times at the sink device, wherein the average time shift is relative to expected packet arrival times of the packets at the sink device.

At 408, the source device detects that the average time shift exceeds a threshold.

At 410, in response to the detection, the BT source adjusts a streaming time of the stream of packets to synchronize, within a predefined tolerance, the source device with the sink device.

In an aspect, the source device can be a master speaker playing an audio data stream and simultaneously streaming the audio data stream to a slave speaker on a Bluetooth link for playing by the slave speaker in sync with the master speaker.

In certain aspects, the feedback received from the sink device includes an acknowledgement message for each packet in the stream of packets transmitted by the source device. The acknowledgement message can include a positive acknowledgement (ACK) indicating that a corresponding packet was successfully received by the BT sink, or can include a negative acknowledgement (NACK) indicating that the corresponding packet was not correctly received by the BT sink. In certain aspects, the BT source knows an expected round trip time from the time a packet is transmitted to the time an acknowledgement for the packet is received. In an aspect, the BT source calculates this round trip time based on known latencies associated with the BT link (e.g., BT link 320) between the BT source and the BT sink, latencies associated with BT sink device and other predictable latencies associated with the system. Assuming that the expected round trip time remains more or less constant (e.g., within a predefined tolerance), a delay in the arrival time of a particular packet acknowledgement relative to an expected arrival time of the packet acknowledgement reflects a corresponding delay in arrival of the packet at the BT sink. Thus, if the BT source is expecting an acknowledgement message for a particular packet to arrive at time X, but the acknowledgement message actually arrives at time Y (where Y>X), the delay in arrival of the packet at the BT sink relative to an expected arrival time of the packet can be Z=(Y−X). Thus, the BT source can safely assume that the delay in arrival of a packet acknowledgement at the BT source is same as the delay in arrival of a corresponding packet at the BT sink.

In certain aspects, the BT source maintains a moving average of packet arrival delays. In an aspect, the BT source calculates an average packet arrival delay over a predetermined time period (e.g., 1, 2, 3, 4, or 5 seconds). For example, the BT source calculates the packet delay for every received acknowledgement message and then averages out the packet delays over acknowledgement messages received for the past 3 seconds. In an aspect, the BT source can calculate this average packet arrival delay after receiving every acknowledgement, after every few acknowledgements (e.g., after every 2, 3, 4, 5, 6, 7, or 8 acknowledgements) or based on some other predetermined criterion (e.g., detection of movement of at least one of the BT source or BT sink).

In certain aspects, the BT source monitors the moving average of the packet arrival delays and when the moving average exceeds a predetermined threshold delay (e.g., 2, 3, 4, 5, 8, 10, 15, 20, 25, 30, or 50 ms), the BT source takes at least one action to bring the BT source back in sync with the BT sink. The predetermined threshold delay can be set to a value beyond which a phase difference (as a result of the delay) between audio outputs of the source and the sink can be perceived by human beings.

In an aspect, when the BT source detects that the moving average of the packet arrival delays has exceeded the predetermined threshold level, the BT source can temporarily pause transmission of the audio stream and resume the transmission after the determined average packet arrival delay. In other words, the BT source shifts the timing of transmission of the audio stream by the determined average packet arrival delay. Additionally, the BT source can delay audio output from its local acoustic transducer also by the same determined average packet arrival delay to match the audio output of the BT sink. In an aspect, the audio output from the source and the sink can be temporarily muted while performing the re-synchronizing operations and may be resumed once the operations are completed. In another aspect, the BT source can reduce the volume of audio output to a predetermined level while making the timing adjustment.

In an aspect, when the BT source detects that the moving average of the packet arrival delays has exceeded the predetermined threshold level, the BT source can adjust the timing of audio output immediately (e.g., by muting the audio output), or can wait for a more convenient and less intrusive time to make the adjustment (e.g., during commercials, between audio tracks, etc.). In an aspect, the time of adjustment can be chosen based on some default intelligence built into the BT source and/or user preferences. For example, in a specific implementation, when the BT source detects that the average packet arrival delay has exceeded the threshold, if more than a specific percentage (e.g., 80, 85, 90 or 95%) of the audio track has elapsed, the BT source waits until track end to make the timing adjustment.

In an aspect, when the BT source detects that the moving average of the packet arrival delays has exceeded the predetermined threshold level, the BT source can gradually delay the streaming time of the packet stream until the delayed timing of the packet stream matches the determined average packet arrival delay. Additionally, the BT source can gradually delay audio output from its local acoustic transducer at the same rate until the delayed audio output matches the same determined average packet arrival delay.

In an aspect, if the threshold is too small, there can be constant adjustments leading to too many interruptions in the audio output. On the other hand, if the threshold is set too high, the user will start noticing the difference in audio outputs from the source and sink speakers. Thus, the threshold must be set to a value so that the audio stream is not interrupted as long as possible without the user perceiving the delay in audio playback. In an aspect, a value of the threshold delay can be a default value (e.g., 10 ms) selected based on data relating to when the human beings start perceiving the phase difference between audio outputs of the source and the sink. In alternative aspects, the value of the threshold delay can be a function of the nature of the BT sink device. For example, if the BT sink device is a Bluetooth headphone, the user may not perceive the phase difference with an out-loud BT source device. In this case, to avoid interruptions in audio output, the threshold delay can be set to a very high value so as to not trigger any action from the BT source to re-synchronize with the BT sink.

In certain aspects, there can be situations when the quality of the Bluetooth link actually improves (e.g., when the user physically brings the sink device closer to the source device) and audio packets start arriving at the sink device earlier than expected leading to a negative packet arrival delay. This too is not an ideal situation as faster packet arrival times at the sink device can lead to faster than expected audio output by the sink device, which again can lead to a phase difference between the audio outputs of the source and sink devices. In this case, the average packet arrival delay calculated at the BT source is a negative value. In an aspect, when the BT source detects that the negative value of the average packet arrival delay has exceeded a predetermined threshold level, the BT source can adjust the steaming time of the packet stream by speeding up the transmission by the determined negative average packet arrival delay. Additionally, the BT source can speed up audio output from its local acoustic transducer also by the same determined negative value of the average packet arrival delay to match the audio output of the BT sink. In an aspect, the threshold delay value used in case of negative delay values can be set in accordance with similar principles discussed above for setting the threshold delay value in case of positive delays. Further, the same techniques for selecting a time for adjusting the stream time applies in this context.

In certain aspects, the moving average of packet arrival delay is reset every time an adjustment to the transmission timing is carried out. The calculation of the moving average is started over after every timing adjustment.

In certain aspects the BT source device can be receiving the audio stream from an audio source device (e.g., AV receiver, sound bar, smart phone etc.). In this case, when the BT source adjusts the timing of packet transmission to the BT sink, the timing of packet transmission from the audio source device to the BT source also needs to be adjusted accordingly.

Figure 5:
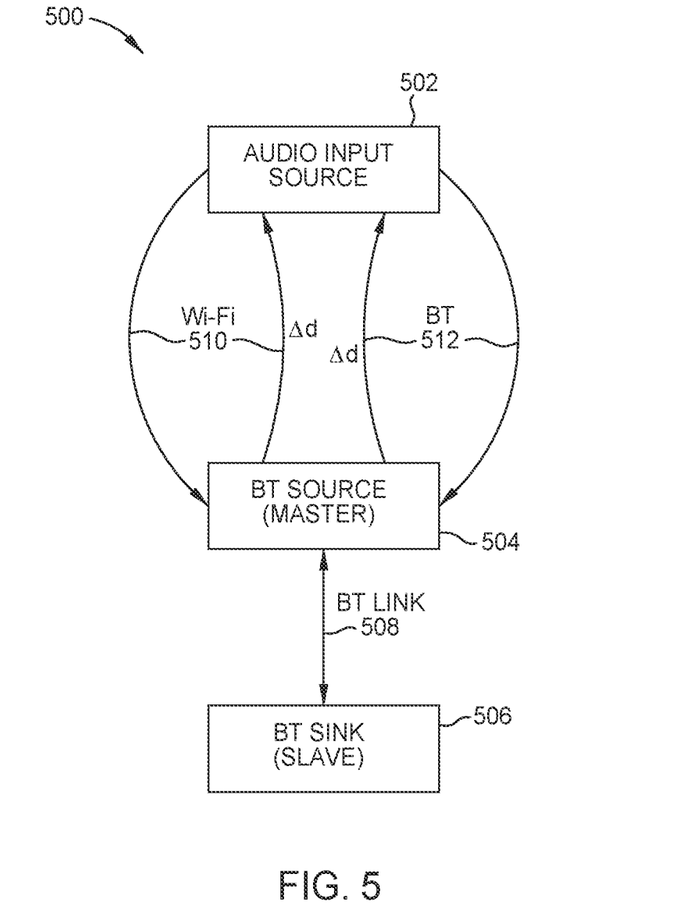
FIG. 5 illustrates an example master-slave audio system of audio output devices in which aspects of the present disclosure can be practiced.

FIG. 5 illustrates an example master-slave audio system 500 of audio output devices in which aspects of the present disclosure can be practiced.

As shown in FIG. 5, a BT source device 504, which is a master speaker, is connected to a BT sink device 506, which is a slave speaker, via a Bluetooth link 508. The BT sink device 506 is configured to receive an audio stream from the BT source device 504 over the BT link 508. The BT source device 504 and the BT sink device 506 are configured to output audio in sync with each other. The BT source device 504 receives the audio stream from an audio input source 502. The BT source device 504 can be connected to the audio input source 502 via at least one of a Wi-Fi link 510 or another BT link 512. In an aspect, when the BT source device 504 adjusts the timing of packet transmission to the BT sink, the BT source also transmits a delay report to the audio input source, the delay report including information relating to the amount by which the timing of the transmission to the BT sink has been adjusted. For example, the BT source device 504 transmits to the audio input source 502 the value of the average packet arrival delay (Δd) by which the BT source device 504 has adjusted the timing of packet transmission to the BT sink device 506. In an aspect, the BT source device 504 can transmit the delay report over the Wi-Fi link 510, the Bluetooth link 512 or both, depending on which of the links is active. In an aspect, when transmitting the delay report via the BT link 512, the delay report can include an A2DP delay report. In an aspect, the delay report transmission to the audio input source 502 can be triggered in response to the BT source device 504 detecting that the average packet arrival delay determined at the BT source device 504 has exceeded a predetermined threshold level.

In an aspect, in response to receiving the delay report from the BT source device 504, the audio input source 502 can adjust the timing of packet transmission to the BT source device 504. For example, the audio input source 502 can adjust (e.g., delay or speed up) the transmission of the packet stream by Δd as received in the delay report to match the timing of transmission from the BT source device 504 to the BT sink device 506. In an aspect, when the audio input source 502 is connected to the BT source device 504 only via the Wi-Fi link 510, the audio input source 502 sends a new reference for playing the first sample of the packet stream after the adjustment, where the new reference is adjusted (e.g., delayed or sped up) by Δd. In an aspect, when the audio input source 502 is connected to the BT source device 504 only via the BT link 512, the audio input source 502 alters the transmission time of packets by Δd and resumes packet transmission to the BT source device 504 at the altered transmission timing.

It can be noted that, descriptions of aspects of the present disclosure are presented above for purposes of illustration, but aspects of the present disclosure are not intended to be limited to any of the disclosed aspects. Many modifications and variations will be apparent to those of ordinary skill in the art without departing from the scope and spirit of the described aspects.

In the preceding, reference is made to aspects presented in this disclosure. However, the scope of the present disclosure is not limited to specific described aspects. Aspects of the present disclosure can take the form of an entirely hardware embodiment, an entirely software embodiment (including firmware, resident software, micro-code, etc.) or an embodiment combining software and hardware aspects that can all generally be referred to herein as a "component," "circuit," "module" or "system." Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium can be any tangible medium that can contain, or store a program.

The flowchart and block diagrams in the Figures illustrate the architecture, functionality and operation of possible implementations of systems, methods and computer program products according to various aspects. In this regard, each block in the flowchart or block diagrams can represent a module, segment or portion of code, which comprises one or more executable instructions for implementing the specified logical function(s). In some alternative implementations the functions noted in the block can occur out of the order noted in the figures. For example, two blocks shown in succession can, in fact, be executed substantially concurrently, or the blocks can sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

What is claimed is:

1. A method comprising:
   playing first audio at a source device;
   transmitting, from the source device to a sink device, a stream of packets to be used by the sink device for playing second audio, the playing of the second audio to be synchronized within a predefined tolerance with the playing of the first audio; and
   in response to determining there is a delay in average packet arrival times of the stream of packets at the sink device, adjusting the playing of the first audio at the source device to maintain synchronization with the playing of the second audio within the predefined tolerance.

2. The method of claim 1, wherein the determining there is a delay in average packet arrival times of the stream of packets at the sink device includes determining at time shift in an arrival time of at least one acknowledgement message for a packet of the stream of packets relative to an expected arrival time for the at least one acknowledgement message.

3. The method of claim 2, wherein the delay in the average packet arrival times of the stream of packets at the sink device is designated as the time shift in the arrival time of the at least one acknowledgement message.

4. The method of claim 3, wherein the delay is an average time shift in arrival times of acknowledgement messages for multiple packets of the stream of packets over a predetermined time period.

5. The method of claim 1, wherein the determining there is a delay in average packet arrival times of the stream of packets at the sink device includes a delay report indicating the average time shift in the packet arrival times at the sink device.

6. The method of claim 1, wherein the determining there is a delay in average packet arrival times of the stream of packets at the sink device determines a positive time shift.

7. The method of claim 6, wherein the adjusting of the playing of the first audio at the source device to maintain synchronization with the playing of the second audio within the predefined tolerance includes
- pausing the transmitting of the stream of packets for a time equal to the delay and
- resuming the transmitting of the stream of packets after the pausing.

8. The method of claim 6, wherein the adjusting of the playing of the first audio at the source device to maintain synchronization with the playing of the second audio within the predefined tolerance includes temporarily slowing down the transmitting of the stream of packets.

9. The method of claim 1, wherein the determining there is a delay in average packet arrival times of the stream of packets at the sink device determines a negative time shift.

10. The method of claim 9, wherein the adjusting of the playing of the first audio at the source device to maintain synchronization with the playing of the second audio within the predefined tolerance includes temporarily speeding up the transmitting the stream of packets.

11. A source device comprising:
- at least one electro-acoustic transducer; and
- at least one processor configured to
  - play first audio using the at least one electro-acoustic transducer,
  - transmit, to a sink device, a stream of packets to be used by the sink device for playing second audio, the playing of the second audio to be synchronized within a predefined tolerance with the playing of the first audio, and
  - in response to determining there is a delay in average packet arrival times of the stream of packets at the sink device, adjust the playing of the first audio to maintain synchronization with the playing of the second audio within the predefined tolerance.

12. The source device of claim 11, wherein the determining there is a delay in average packet arrival times of the stream of packets at the sink device includes determining at time shift in an arrival time of at least one acknowledgement message for a packet of the stream of packets relative to an expected arrival time for the at least one acknowledgement message.

13. The source device of claim 12, wherein the delay in the average packet arrival times of the stream of packets at the sink device is designated as the time shift in the arrival time of the at least one acknowledgement message.

14. The source device of claim 13, wherein the delay is an average time shift in arrival times of acknowledgement messages for multiple packets of the stream of packets over a predetermined time period.

15. The source device of claim 11, wherein the determining there is a delay in average packet arrival times of the stream of packets at the sink device includes a delay report indicating the average time shift in the packet arrival times at the sink device.

16. The source device of claim 11, wherein the determining there is a delay in average packet arrival times of the stream of packets at the sink device determines a positive time shift.

17. The source device of claim 16, wherein the adjusting of the playing of the first audio at the source device to maintain synchronization with the playing of the second audio within the predefined tolerance includes
- pausing the transmitting of the stream of packets for a time equal to the delay and
- resuming the transmitting of the stream of packets after the pausing.

18. The source device of claim 16, wherein the adjusting of the playing of the first audio at the source device to maintain synchronization with the playing of the second audio within the predefined tolerance includes temporarily slowing down the transmitting of the stream of packets.

19. The source device of claim 11, wherein the determining there is a delay in average packet arrival times of the stream of packets at the sink device determines a negative time shift.

20. The source device of claim 19, wherein the adjusting of the playing of the first audio at the source device to maintain synchronization with the playing of the second audio within the predefined tolerance includes temporarily speeding up the transmitting the stream of packets.

* * * * *